Nov. 30, 1971  S. LOWELL ET AL  3,623,365

PHOTOELECTRIC FLOWMETER

Filed May 7, 1970

INVENTORS
SEYMORE LOWELL
STEWART KARP

BY

*Bauer & Amer*

ATTORNEYS

United States Patent Office 3,623,365
Patented Nov. 30, 1971

3,623,365
PHOTOELECTRIC FLOWMETER
Seymore Lowell, 42 Wood Hollow Road, Albertson, N.Y. 11507, and Stewart Karp, 67 Hickory Lane, Roslyn Heights, N.Y. 11577
Filed May 7, 1970, Ser. No. 48,574
Int. Cl. G01f 1/00
U.S. Cl. 73—209
5 Claims

ABSTRACT OF THE DISCLOSURE

In measuring flow along a flow path between reference proximal and distal ends of said path, the technique of beaming light from the proximal end along the path and blocking select extents of the light from being transmitted to the distal end by a flow-measuring float or element in the flowing fluid so that the light which is transmitted to the distal end is correlated to flow parameters, and utilizing the transmitted light to provide a convenient display of what is being measured.

---

The present invention relates generally to flowmeters, and more particularly to an improved flowmeter in which the output measurements are electrical and thus are advantageously used to operate a remote display, a stylus, or other such automatic recording device.

In wide use are various models of a so-called rotometer or flowmeter which utilizes the principle of a slightly tapered flow tube with a float, the position of the float varying, in a well understood manner, in proportion to the flow rate. In practice, the user must actually observe the position of the float relative to a scale or the like; thus the user's presence at the flowmeter is required as well as his personal attention whenever a reading is to be taken.

Broadly, it is an object of the present invention to provide improvements for a flowmeter overcoming the foregoing and other shortcomings of the prior art. Specifically, it is an object to provide a flowmeter which provides an electrical output correlated to the flow parameters that are being measured, said electrical output being, of course, readily transmitted to operate a remote display which may even be an automatic recorder.

A flowmeter demonstrating product aspects of the present invention includes a flow metering tube, preferably of glass which, of course, is both permeable to and refracts light. Operating in the tube is a metering float, the varying position of which reflects the rate of flow, fluid viscosity, or the like. A cooperating light source and photoelectric cell is arranged adjacent opposite ends of the tube so that the metering float, by virtue of its interposed position in the light being beamed between the source and cell, selectively monitors the extent of light impinging on the photoelectric cell as a function of the position of the float along the tube. Since the float position is correlated to rate of flow or the like being measured, the extent of the impinging light and the electrical output which it produces is similarly correlated to that which is being measured.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
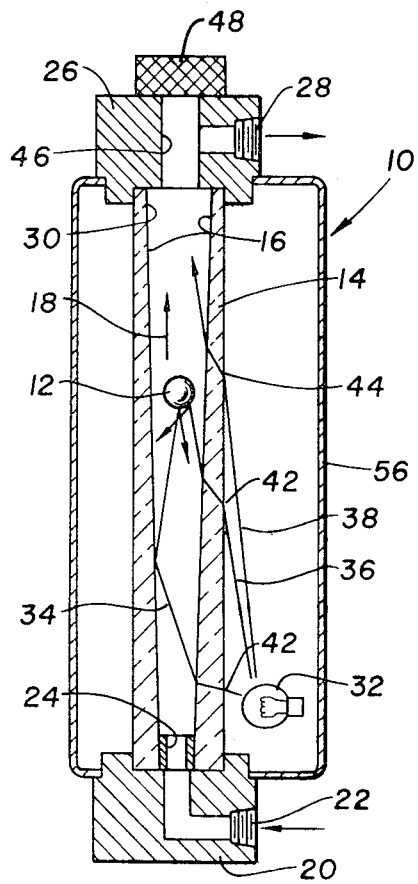
FIG. 1 is an elevational view, in section, of a flowmeter according to the present invention, the same having a mode of operation exemplifying the inventive method hereof of measuring flow.

Reference is now made to the drawings wherein there is shown an electrified flowmeter, generally designated 10, demonstrating objects and advantages of both the product and method aspects of the present invention. As generally understood, there are available numerous models of flowmeters, exemplified in part by the flowmeter 10, in which measurements are made of the flow rate and, in some instances, of the viscosity of liquids or gases passed through the flowmeter 10. One such commercially available meter is the Series 1400 flowmeter available from Brooks Instrument, division of Emerson Electric of Hatfield, Pennsylvania. A serious shortcoming of such prior art constructed and operated flowmeters is that the measurements thereof require observation by the user, namely observation of the position of a metering float 12 in relation to graduations along a glass metering tube 14, all as will be explained in detail subsequently. Underlying the present invention is the recognition that flowmeters, of the class just described, can be readily converted into a flowmeter which provides its flow measurements in electrical units, either as voltage or current, both of which not only are readily measured by meters but, more significant, can be measured at locations remote from the actual flowmeter 10. Additionally, it is not necessary for the user to make any actual observation of the position of the metering float 12 since the electrical output of the converted flowmeter 10 can be used to power a recording stylus or other such automatic recorder.

For purposes of understanding the present invention, it suffices to note that the conventional construction of the flowmeter 10 hereof includes the already noted metering float 12 and the glass metering tube 14, the latter having an inner surface 16 bounding an internal flow passageway or flow path 18 of progressively enlarged dimension proceeding from the lower to the upper ends of the tube 14. As generally understood, tube 14 has a fitting 20 at its lower end defining an inlet 22 communicating with the lower end opening 24, and has a similar fitting 26 providing an outlet 28 communicating with the other upper end opening 30. In practice, the fluid whose rate or viscosity is to be measured is connected so that it flows into the inlet 22, along the flow path 18, and exits through the outlet 28. During movement along the flow path 18, the fluid is effective, in a well understood manner, of supporting the metering flow 12 in a pressure equalized or balanced position along the metering tube 14 which is indicative of the flow rate or viscosity of the fluid.

An important contribution of the present invention is the recognition that the metering tube 14, which in a preferred form is fabricated of tempered glass which is both light-permeable and light-reflecting, can be effectively used for light transmission. That is, it is effectively used in a cooperating relation to the conventional and known product aspects of the flowmeter to provide an electrical read-out of the flow measurements. Specifically, as illustrated in FIG. 1, the improved flowmeter 10 hereof includes a light source 32 which will be understood to be appropriately mounted in a laterally offset position, as illustrated, adjacent the metering tube lower end 24 (or for purposes of this description, the tube proximal end). The light rays from the source 32, as exemplified by the rays 34, 36 and 38, accordingly enter at progressively different entry points 40, 42 and 44, respectively, into the flow path 18. Additionally, the glass refracting surface 16 of tube 14 is effective, by refraction, of transmitting the entering light rays (as exemplified by rays 34 and 36) along the flow path 18 toward the upper tube end 30 (or for purposes of this description, the tube distal end). However, as clearly illustrated in FIG. 1, the metering float 12, by virtue of its interposed position between the light source 32 located adjacent the proximal tube end 24 and the distal tube end 30 is effective in intercepting a portion of the light being beamed from the light source 32 and in causing such intercepted light to be reflected back toward the light source 32. Thus, this intercepted light is effectively blocked from being transmitted to and through the tube end opening 30. On the other hand, the light rays, as exemplified by ray 38, entering the light path 18 above the metering float 12, as at 44, passes in an unrestricted manner towards and through toe end opening 30.

End opening 30 opens into a vertical through bore 36 in fitting 26. Appropriately mounted across the end opening of bore 46 is a light meanuring means 48, such as a photoelectric cell. Good results have been achieved with a cadmium sulfide photoelectric cell manufactured by General Electric. Operating in a well understood manner, cell 48, in response to the extent of light actually impinging upon it, is effective in producing a corresponding electrical signal. Since, as just described, the extent of light which impinges upon the photoelectric cell 48 is related to the position of the metering float 12, it therefore follows that the electrical signal produced by the cell 48 is similarly related to the operative position of the metering float.

Figure 2:
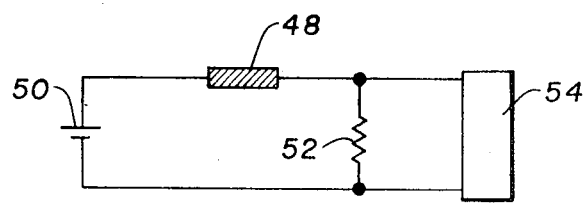
FIG. 2 is a simplified circuit diagram of the electrical components operatively associated with the flowmeter to produce flow measurements from electrical units.

FIG. 2 illustrates an appropriate electrical circuit for utilizing the output of the photoelectric cell 48. Specifically, the circuit includes, in addition to the cell 48, an input voltage 50, which may be either alternating current or direct current, a resistance 52, and an appropriate measurement displaying device 54 powered by the circuit such as a volt meter, stylus or other such recorder.

In order to prevent ambient light from effecting the reading of the cell 48, flowmeter 10 is appropriately provided with a light shield 56.

Figure 3:
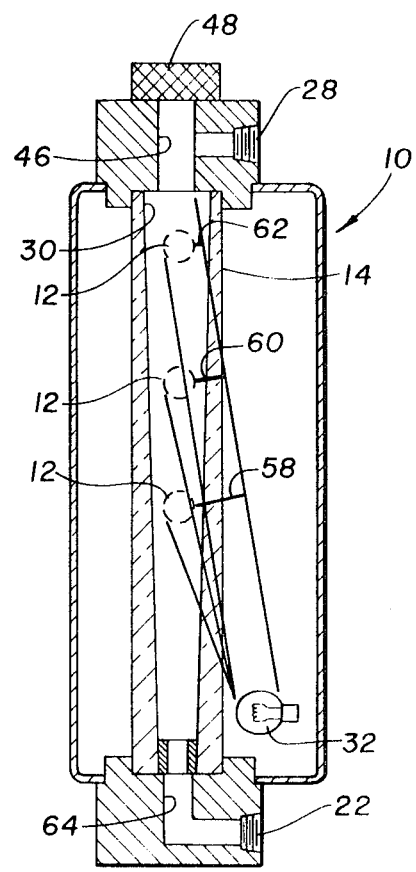
FIG. 3 is a view similar to FIG. 1 graphically illustrating, in simplified form, the manner in which flow measurements are achieved.

FIG. 3, to which reference is now made, graphically illustrates the manner in which the varying operative positions of the metering float 12, as exemplified by the three illustrated positions thereof, produces correspondingly varying readings in the photoelectric cell 48. Specifically, in the lowermost position of float 12, of the total light being beamed by the source 32, the major extent 58 thereof, by virtue of the offset relation of source 32 from the tube 14, passes in an unrestricted manner past the float 12 and enters into passageway 46 for impingement upon the photoelectric cell 14. In the intermediate illustrated position of the float 12, however, the movement towards the distal end 30 results in a greater masking of the light being beamed by the light source 32. Accordingly, a lesser extent of light 60 is transmitted to and impinges upon the photoelectric cell 48. The remaining upper float position illustrates a geometry wherein only a nominal extent of light 62 is permitted to impinge upon the photoelectric cell 48. In this manner, varying extents of light 58, 60 and 62 which have a correlation with and reflect the operative position of the metering float 12 are selectively permitted to impinge upon the photoelectric cell 48 and, in this way, provide measurements correlated to measurements of flow indicative of the varying positions of the metering float.

It should be noted that the positions of the light source 32 and photoelectric cell 48 can be reversed wherein source 32 would be mounted laterally adjacent the tube end 30 and the photoelectric cell 48 straddling the end of the vertical leg 64 of inlet 22. In this reversed arrangement, the balanced position of the metering float 12 adjacent the upper end 30 which previously was indicative of a high flow rate and also previously permitted a minimal extent of light to impinge upon the photo cell 48 would indicate the same flow rate but in response to a maximum extent of impinging light. In either the illustrated or reversed arrangements, however, the electrical read-out from the photoelectric cell 48 is correlated and thus related to the operative position of the metering float 12, in one instance the relation being directly proportional and in the other instance inversely proportional.

From the foregoing, it should be readily appreciated that there has been described herein a flowmeter 10 which is effective in measuring rates of flow and other such related perameters of either liquid or gas wherein the output of the meter is an electrical signal which advantageously can be used to obviate the requirement of direct visual observation of the flow meter in order to determine the measurements thereof.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method of measuring fluid flow comprising the steps of flowing said fluid to be measured along a flow path bounded by light-permeable and light-reflecting material, beaming light from a source located at a selected proximal end of and laterally adjacent to said flow path for entry therealong into said flow path, refracting said entering light along said flow path toward a distal end thereof, blocking a selected extent of said refracted light from being transmitted to said distal end as a function of said flow along said flow path, and measuring the extent of light that is actually transmitted to said distal end, whereby said measured extent of light is correlated with said measured fluid flow.

2. A method of measuring fluid flow as defined in claim 1 including floating a member for movement throughout a range of operative positions along said flow path as a function of fluid flow therealong so as to effectively cause said blocking of said refracted light along said flow path.

3. In combination, a flowmeter of the type including means defining a flow path for a reference fluid flowing therethrough and an electric flow-measuring means comprising a photoelectric cell located across one end of said flow path, a light source located in a laterally offset relation to said flow path adjacent an end thereof remote from said photoelectric cell so as to beam light along said flow path to said photoelectric cell, and a metering float disposed in said flow path for movement through a range of operative positions therealong as a function of fluid flow along said flow path, said metering float operative positions having an interposed relation to said photoelectric cell and light source so as to selectively intercept an extent of light beamed therebetween, whereby said remaining extent of said beamed light impinging on said photoelectric cell provides measurements correlated to measurements of flow indicative of the varying positions of said metering float along said flow path.

4. A combined flowmeter and electric flow-metering means as defined in claim 3 wherein said light beamed from said light source subtends an acute angle with said flow path.

5. A combined flowmeter and electric flow-measuring means as defined in claim 4 wherein said flow path is formed as a longitudinal passageway along a light-permeable and light-refracting member.

References Cited

UNITED STATES PATENTS 2,808,580   10/1957   Fuller _____ 73—209

JERRY W. MYRACLE, Primary Examiner